(12) United States Patent
Egan et al.

(10) Patent No.: US 7,751,075 B2
(45) Date of Patent: Jul. 6, 2010

(54) METHOD AND SYSTEM FOR MANAGING A DIGITAL PHOTO DATABASE

(75) Inventors: Kathleen M. Egan, Cape Canaveral, FL (US); David W. Craig, Titusville, FL (US); Steven C. Hord, Merritt Island, FL (US)

(73) Assignee: The Boeing Company, Chicago, IL (US)

( * ) Notice: Subject to any disclaimer, the term of this patent is extended or adjusted under 35 U.S.C. 154(b) by 1288 days.

(21) Appl. No.: 11/258,632

(22) Filed: Oct. 26, 2005

(65) Prior Publication Data

US 2007/0070434 A1 Mar. 29, 2007

Related U.S. Application Data

(60) Provisional application No. 60/720,674, filed on Sep. 26, 2005.

(51) Int. Cl.
*G06F 3/12* (2006.01)
(52) U.S. Cl. ............... 358/1.15; 358/474; 358/906; 358/403; 382/305; 235/375; 707/200; 705/26; 709/206; 709/203
(58) Field of Classification Search ............... 358/1.15, 358/3.28, 445, 403, 471, 906, 909.1; 382/306, 382/305; 348/231, 3, 231.99, 333.05, 231.06, 348/211.1; 235/462.42, 375; 707/200; 705/26, 705/51; 709/206, 203; 726/25, 28
See application file for complete search history.

(56) References Cited

U.S. PATENT DOCUMENTS

| | | | | |
|---|---|---|---|---|
| 7,039,486 B2* | 5/2006 | Wang | ............... | 700/117 |
| 7,461,331 B2* | 12/2008 | Morris | ............... | 715/205 |
| 7,475,092 B2* | 1/2009 | Rothschild | ............... | 707/104.1 |
| 7,536,260 B2* | 5/2009 | Hillman | ............... | 702/3 |
| 7,545,428 B2* | 6/2009 | Battles et al. | ............... | 348/333.11 |
| 7,561,305 B2* | 7/2009 | Kitagawara et al. | ............... | 358/2.1 |
| 2004/0004738 A1* | 1/2004 | Ikeda | ............... | 358/1.15 |
| 2004/0260625 A1* | 12/2004 | Usami et al. | ............... | 705/26 |
| 2005/0073601 A1* | 4/2005 | Battles et al. | ............... | 348/333.05 |
| 2005/0157346 A1* | 7/2005 | Kitagawara et al. | ............... | 358/2.1 |
| 2006/0028695 A1* | 2/2006 | Knighton et al. | ............... | 358/474 |
| 2007/0052997 A1* | 3/2007 | Hull et al. | ............... | 358/1.15 |
| 2007/0061895 A1* | 3/2007 | Ceraolo et al. | ............... | 726/28 |

* cited by examiner

*Primary Examiner*—Negussie Worku
(74) *Attorney, Agent, or Firm*—Yee & Associates, P.C.; John A. Lepore

(57) ABSTRACT

Method and system for storing and managing digital images in a database is provided. The method includes, acquiring plural digital images based on digital image requirements for product assemblies; uploading the plural digital images to the database; making the digital images available to plural users via a user interface that allows the plural users to electronically accept or reject a digital image, based on authority of the user; and notifying plural users if an authorized user rejects a digital image, wherein the users are notified via electronic mail. The system includes a database for storing plural digital images; and a user interface that allows plural users to view the plural digital images, approve or reject a digital image based on user authority, and view a status of whether users have approved or rejected any of the plural digital images.

18 Claims, 27 Drawing Sheets

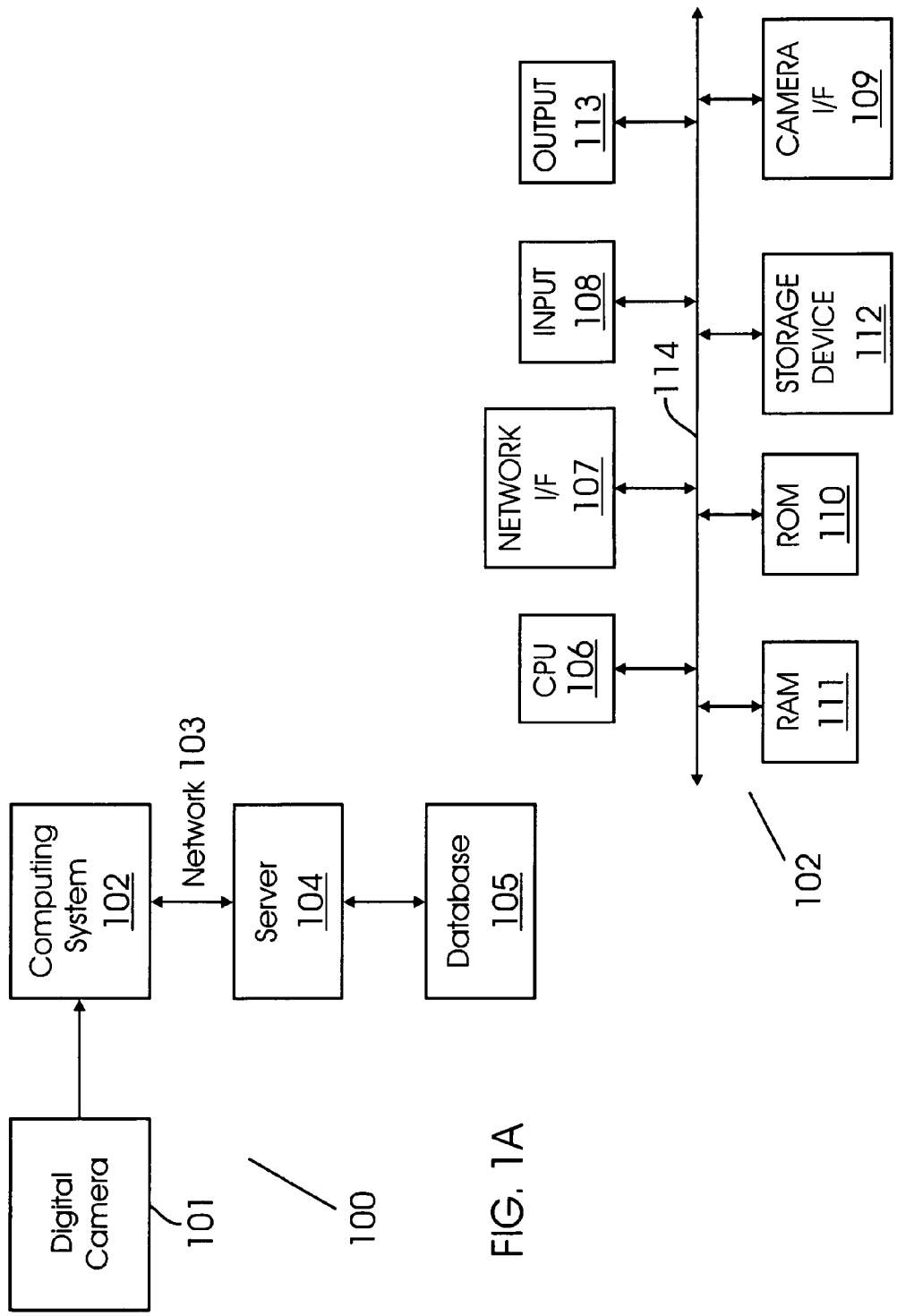

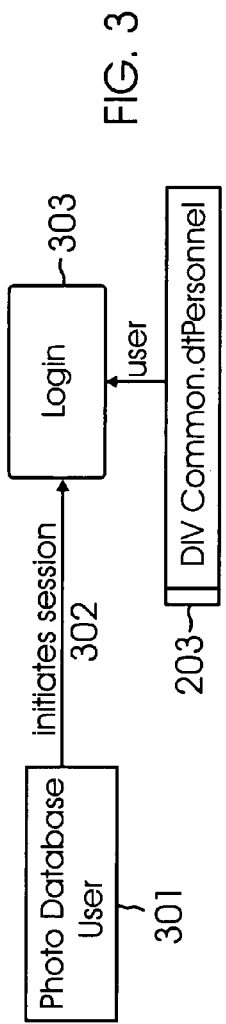
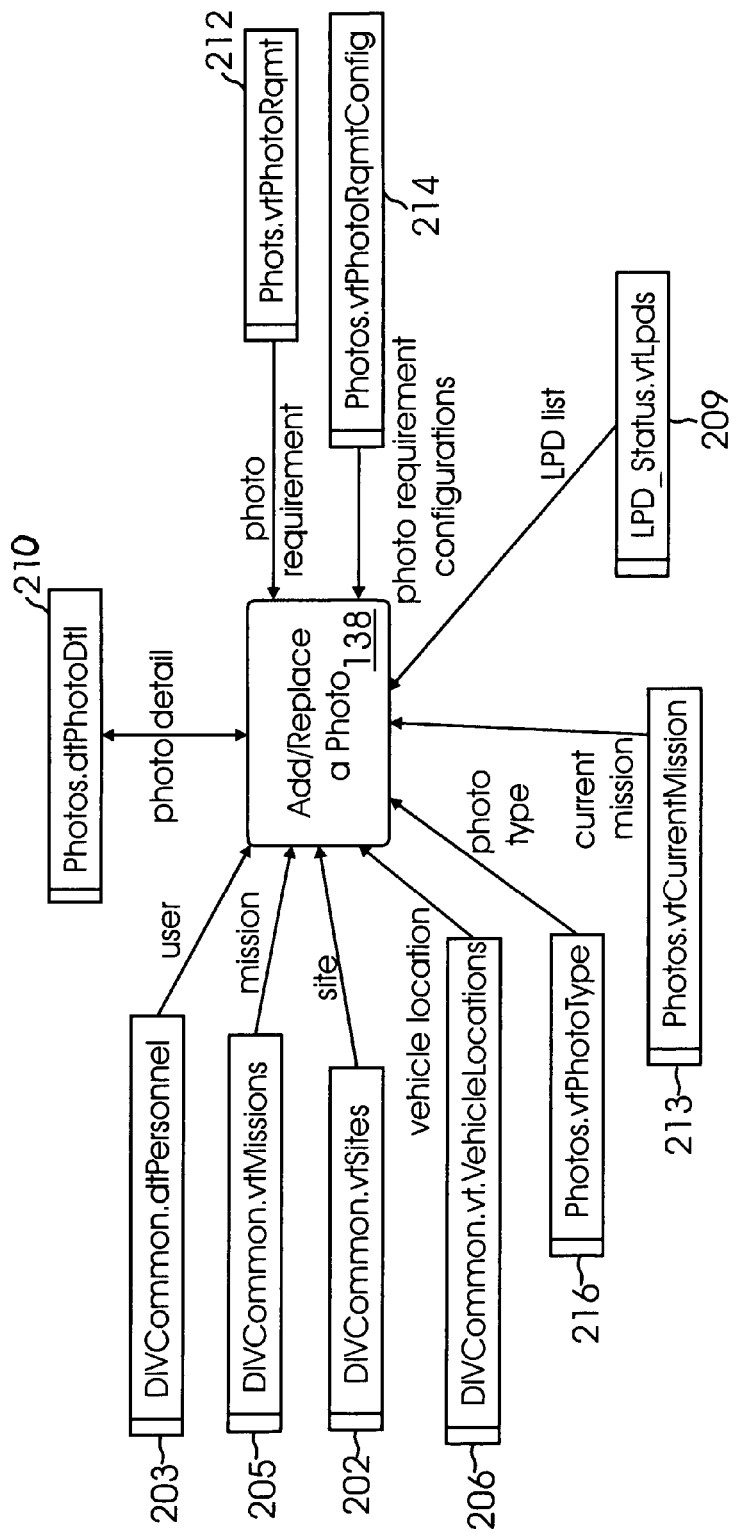
FIG. 3
FIG. 4

Mission: testMission
Vehicle Location: All
Approval Status: All Statuses

Summary of photos

4 Selected/4 total
Sort by: Rqmt # ▶ Find

| Rqmt# Click to view photo 902A | Rev | Vehicle Location WAD # 902B | Photo Description Click to view photo data 902C | Reviewer Type 902D | Approve 902E | Reject 902F | Final Approval 902G |
|---|---|---|---|---|---|---|---|
| 1.1 | | Core CBC | picture of component 1 | Responsible Mechanical Engineer | 👆 | R | ✓ |
| 1.2 | | Core CBC | picture of component 2 | | A | R | |
| 1.3 | | Core CBC | picture of component 3 | | A | R | |
| 1.4 | | Core CBC | picture of component 4 | | A | R | |

FIG. 11

| Rqmt#: 1.2 | Location: Core CBC | | | |
|---|---|---|---|---|
| Mission: testMission | Site: | | Program: | Configuration: |
| WAD & Task#: | | | | WAD Title: |
| Final Approval Date: | Work Area: DOC | Input By: User1, Joe(555-111-1111) on 9/12/2005 3:09:53 PM | | |
| Photo description | | | | |
| Picture of component 2 | | | | |
| Photographer Comments | | | | |

Approval Status

| | Status | Name | Phone | Date/Time | Comment |
|---|---|---|---|---|---|
| Approvers  1201 | | | | | |
| Chief Engineer | approved | User1, Joe | 555-111-1111 | 9/12/2005 3:15:42 PM | |
| Chief Test Conductor | rejected | User1, Joe | 555-111-2222 | 9/12/2005 3:16:46 PM | (9/12/2005 3:16:46 PM) Something is missing in the photo. |
| Launch Site Director | | | | | |
| Reviewers  1202 | | | | | |
| Responsible Mechanical Engineer | reviewed | User5, Joe | 555-111-5555 | 9/12/2005 3:23:04 PM | |

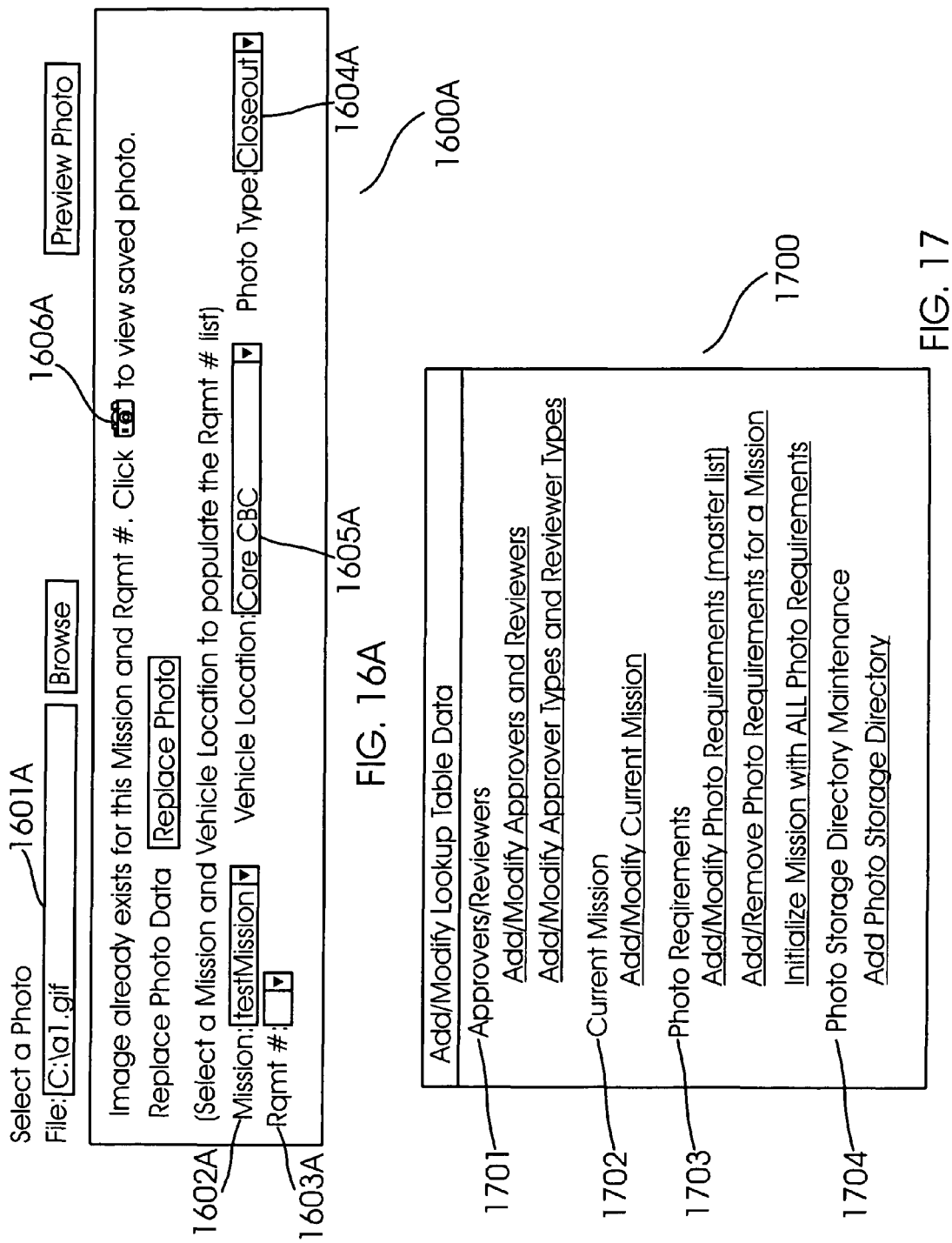

Approvers/Reviewers

1801 — Add

| Approver/Reviewer Type | Name | Is Primary Approver/Reviewer? | Active? | Delete | Edit |
|---|---|---|---|---|---|
| Chief Engineer | User1, Joe | Yes | Yes | X | O |
| Chief Test Conductor | User2, Joe | Yes | Yes | X | O |
| Launch Site Director | User3, Joe | Yes | Yes | X | O |
| Responsible Electrical Engineer | User4, Joe | Yes | Yes | X | O |
| Responsible Mechanical Engineer | User5, Joe | Yes | Yes | X | O |

Add an Approver/Reviewer  (*required fields)

1901 — *Approver/Reviewer: [ ▸ ]
1902 — *Approver/Reviewer Type: [ ▸ ]
1903 — *Is Primary: [No ▸]
       *Active: [Yes ▸]

[Submit]  [Reset]

Modify the Approver/Reviewer (*required fields)

*Approver/Reviewer: User1, Joe
*Approver/Reviewer Type: Chief Engineer
*Is Primary: Yes ▼
*Active: Yes ▼

[Submit]  [Reset]

Approver/Reviewer Types

| Description | Approval Required? | Active? | Edit |
|---|---|---|---|
| Chief Engineer | Yes | Yes | ○ |
| Chief Test Conductor | Yes | Yes | ○ |
| Launch Site Director | Yes | Yes | ○ |
| Responsible Electrical Engineer | No | Yes | ○ |
| Responsible Mechanical Engineer | No | Yes | ○ |

[Add] — 2101

Add an Approver/Reviewer Type ( *required fields)

*Approver/Reviewer Type: [            ]
*Approval Required: [No ▶]
*Active: [Yes ▶]

[Submit]  [Reset]

FIG. 22  — 2200

Modify the Approver/Reviewer Type ( *required fields)

*Approver/Reviewer Type: [A41 Quality Engineering]
*Approval Required: [No ▶]
*Active: [Yes ▶]

[Submit]  [Reset]

FIG. 23  — 2300

Photo Requirements

Add — 2401

Vehicle Location: Core CBC   ▶ Vehicle Configuration: All ▶    [ ] Find — 2403

2404

| Rqmt # | Work Area | Description | Delete | Edit |
|--------|-----------|-------------|--------|------|
| 1.1 | DOC | picture of component 1 | X | o |
| 1.2 | DOC | picture of component 2 | X | o |
| 1.3 | DOC | picture of component 3 | X | o |
| 1.4 | DOC | picture of component 4 | X | o |

Add a Photo Requirement          (*required fields)

*Requirement #: [          ]

*Vehicle Location: [Core CBC ▼]          *Work Area: [          ]

*Description:
[◄                    ►]

Only checked configurations will be added

| Applicable Configuration | site 1 WAD # | site 1 WAD Task # | site 2 WAD # | site 2 WAD Task # |
|---|---|---|---|---|
| ☐ config 1 | [  ▼] | [  ▼] | | |
| ☐ config 2 | [  ▼] | [  ▼] | | |
| ☐ config 3 | [  ▼] | [  ▼] | | |
| ☐ config 4 | [  ▼] | [  ▼] | | |
| ☐ config 5 | [  ▼] | [  ▼] | | |
| ☐ config 6 | [  ▼] | [  ▼] | | |

[Submit]

FIG. 25

Modify the Photo Requirement    (*required fields)

*Requirement #: [1.1]

*Vehicle Location: [Core CBC ▶]   *Work Area: [◀    ▶] [DOC]

*Description: [picture of component 1]

| Applicable Configuration | WAD # | WAD Task # | WAD # | WAD Task # |
|---|---|---|---|---|
| ☑ config 1 | ▶ | ▶ | | |
| ☐ config 2 | ▶ | ▶ | | |
| ☐ config 3 | ▶ | ▶ | | |
| ☐ config 4 | ▶ | ▶ | | |
| ☐ config 5 | ▶ | ▶ | | |
| ☐ config 6 | ▶ | ▶ | | |

[Submit]

Launch Site Photo Requirements for Mission

Mission: [testMission ▼]    Vehicle Location: [All ▼]    [Submit Changes]

| Rqmt # | Vehicle Location | Description | Loaded for Mission | Photo already taken | Add Rqmt to Mission | Remove Rqmt from Mission |
|---|---|---|---|---|---|---|
| | | | | | Select All | Select All |
| 1.1 | Core CBC | picture of component 1 | ✓ | | | |
| 1.2 | Core CBC | picture of component 2 | ✓ | ✓ | | |
| 1.3 | Core CBC | picture of component 3 | ✓ | ✓ | | |
| 1.4 | Core CBC | picture of component 4 | | | ☐ | |

[Submit Changes]

Copy Launch Site Photo Requirements for Mission    (*required fields)

*Mission/Configuration: [_____ ▼]

[Submit]    [Reset]

— 2800

Reconciliation Reports (Displays photo requirement data for the specified mission, vehicle location, and WAD number)

*Mission: [▼] Vehicle Location: [All ▼]
WAD#: [All ▼] Task#: [▼]
o All photo requirements
o Photo requirements already satisfied (photo has been taken)
o Photo requirements not yet satisfied (photo has not been taken)
o Photos rejected (photo has been rejected by an approver or reviewer)
o Photo requirements without final approval
  (photo has been taken but has not been approved by all approvers)
o Photos approved by a reviewer but without final approval
  (photo has been taken and has been approved by at least one reviewer but
  has not been approved by all approvers)

Printer Friendly Version ☐ [Submit]

~2901

Data Dump Report (Displays photo data for the specified mission, vehicle location, and WAD number)

*Mission: [▼] Vehicle Location: [All ▼]
WAD#: [All ▼] Task#: [▼]
Sort by [Vehicle Location ▼] and then by [Rqmt# ▼]

Printer Friendly Version ☐ [Submit]

Who hasn't approved? Report (Displays photos not yet approved for the specified mission, vehicle location, WAD number, and reviewer type) — 2903

*Mission: [ ▶]  Vehicle Location: [All ▶]
WAD#: [All ▶]  Task#: [ ▶]
*Reviewer Type: [All ▶]

Sort by [Vehicle Location ▶] and then by [Rqmt# ▶]    Printer Friendly Version ☐ [Submit]

Mission Metric Reports

*Mission: [ ▶]

Count per Reviewer Type of photos not yet approved
(includes both rejected and not reviewed photos)

[Submit]

| Rqmt#: 1,2 [Edit] | Location: Core CBC | | |
|---|---|---|---|
| Mission: testMission | Site | Program: | Configuration: |
| WAD & Task#: | | | WAD Title: |
| Final Approval Date: | Work Area: DOC | Input By: User1, Joe(555-111-1111)on 9/12/2005 3:09:53 PM | |
| Photo Description | | | |
| picture of component 2 | | | |
| Photographer Comments | | | |
| | | | |
| Approval Status | Status | Name | Phone | Date/Time | Comment |

| 30A | 30B |

Photos-Who has not approved? Report (Launch Site)

Mission: testMission, Site: , Reviewer: Responsible Electrical Engineer
Sorted by: Vehicle Location, Rqmt#
Records selected: 2 out of 4 total records for the mission

| Rqmt#: 1.2 | | Mission: testMission | | Location: Core CBC | |
|---|---|---|---|---|---|
| Photo Description | | | | | |
| picture of component 2 | | | | | |
| Approval Status | | | | | |
| Approvers | Status | Name | Phone | Date/Time | Comment |
| Chief Engineer | approved | User1,Joe | 555-111-1111 | 9/12/2005 3:15:42 PM | |
| Chief Test Conductor | rejected | User2,Joe | 555-111-2222 | 9/12/2005 3:16:46 PM | Something is missing in the photo |
| Launch Site Director | | | | | |
| Reviewers | | | | | |
| Responsible Mechanical Engineer | reviewed | User5,Joe | 555-111-5555 | 9/12/2005 3:23:04 PM | |

| Rqmt#: 1.3 | | Mission: testMission | | Location: Core CBC | |
|---|---|---|---|---|---|
| Photo Description | | | | | |
| picture of component 3 | | | | | |
| Approval Status | | | | | |
| Approvers | Status | Name | Phone | Date/Time | Comment |
| Chief Engineer | approved | User1,Joe | 555-111-1111 | 9/12/2005 3:15:42 PM | |
| Chief Test Conductor | approved | User2,Joe | 555-111-2222 | 9/12/2005 3:19:46 PM | |
| Launch Site Director | | | | | |

Count per Reviewer Type of photos not yet approved for mission (includes both rejected and not reviewed photos)

| Reviewer Type | Not Approved |
|---|---|
| Chief Engineer | 30 |
| Chief Test Conductor | 196 |
| Launch Site Director | 14 |
| Senior Manager Quality Assurance | 33 |
| A3 Chief Engineer | 211 |
| A3 Responsible Electrical Engineer | 211 |
| A3 Responsible Mechanical Engineer | 211 |
| A3 Responsible Propulsion Engineer | 211 |
| A3 Responsible Propulsion Engineer-CBC | 211 |
| A3 Responsible Propulsion Engineer-Second Stage | 211 |
| A3 Responsible Propulsion Engineer-Solids | 211 |
| A3 Responsible RS-68 Engineer | 211 |
| A3 Responsible Structures Engineer | 211 |
| A31 Quality Engineering | 211 |
| A41 Quality Engineering | 211 |

METHOD AND SYSTEM FOR MANAGING A DIGITAL PHOTO DATABASE

CROSS-REFERENCE TO RELATED APPLICATIONS

This application claims the benefit, under 35 U.S.C. §119(e), of provisional application No. 60/720,674; filed Sep. 26, 2005, the disclosure of which is incorporated herein by reference in its entirety.

BACKGROUND OF THE INVENTION

1. Field of the Invention

The present invention relates to managing digital images, and more particularly, to providing a web based application that allows multiple users to review digital images on a web-based interface and tracks user review of the digital images.

2. Background

Digital cameras are commonly used in personal and professional situations. Progress in overall computing power has made digital cameras easy to use in various situations. Digital cameras today can be used as a quality inspection tool before a product is released, for example, before a car, aircraft or any other assembled/unassembled product is released. Another use of a digital camera is in sophisticated space programs. Before a rocket/space ship launch, all major assemblies/subassemblies are photographed and the photographs are then reviewed by various personnel for a final approval. Photo requirements for the launch are pre-determined.

Although fast and efficient digital cameras are available, the conventional imaging environment lacks an efficient software based solution that allows users to easily access stored digital images, review the images, approve/reject the images and generate an alert (for example, via email) when an image is rejected. Conventional systems may use a Microsoft Access based databases for managing stored digital images. However, such systems are not flexible or easy to use. Therefore, there is a need for a method and system that provides easy access to digital images where multiple users can review, approve and/or reject digital images.

SUMMARY OF THE PRESENT INVENTION

In one aspect of the present invention, a method for storing and managing digital images in a database is provided. The method includes, acquiring plural digital images based on digital image requirements for product assemblies; uploading the plural digital images to the database; making the digital images available to plural users via a user interface that allows the plural users to electronically accept or reject a digital image, based on authority of the user; and notifying plural users if an authorized user rejects a digital image, wherein the users are notified via electronic mail.

In another aspect of the present invention, a system for managing plural digital images is provided. The system includes a database for storing plural digital images; and a user interface that allows plural users to view the plural digital images, approve or reject a digital image based on user authority, and view a status of whether users have approved or rejected any of the plural digital images.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 1A shows a block diagram of a system for collecting and storing digital images, according to one aspect of the present invention;

FIG. 1B shows a block diagram of the internal architecture of a computing system for executing process steps, according to one aspect of the present invention;

FIG. 3 shows an example for logging in a user, according to one aspect of the present invention;

FIG. 4 shows an example of adding/replacing a digital image, according to one aspect of the present invention;

FIG. 9 shows an example for adding/modifying administrative information, according to one aspect of the present invention; and FIGS. 10-32 show various screen shots of the adaptive aspects of the present invention.

DETAILED DESCRIPTION OF THE PREFERRED EMBODIMENTS

Figure 1C:
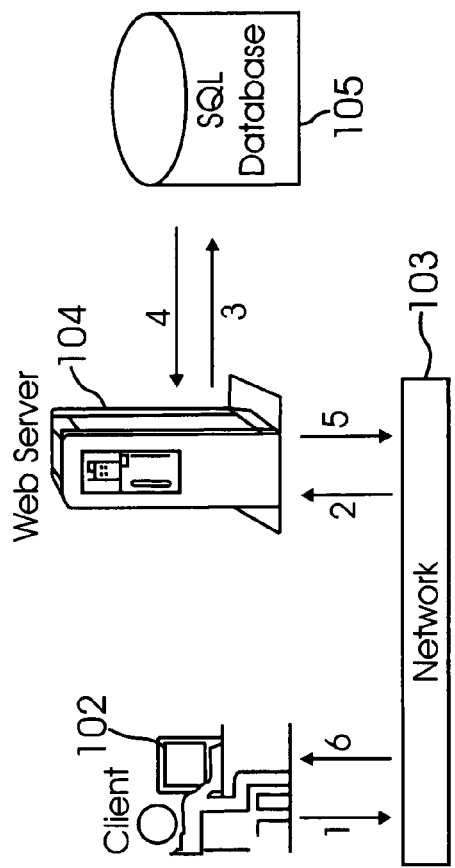
FIG. 1C shows yet another example of a system for storing/managing digital images, according to one aspect of the present invention.

To facilitate an understanding of the preferred embodiment, the general architecture and operation of a computing system/the Internet/overall system will be described. The specific architecture and operation of the preferred embodiments will then be described with reference to the general architecture.

FIG. 1A shows a top-level block diagram of a system 100 that is used to store and provide digital images to a plurality of users, according to one aspect of the present invention. System 100 includes a computing system 102 that can receive digital images from digital camera 101. Computing system 102 is coupled via a network connection 103 to a server 104. In one aspect, server 104 is a web-server. Database 105 is used to store digital images, as described below. In one aspect, database 105 is SQL based.

FIG. 1B is a block diagram showing the internal functional architecture of a computing system 102. As shown in FIG. 1B, computing system 102 includes a central processing unit ("CPU") 106 for executing computer-executable process steps and interfaces with a computer bus 114. Also shown in FIG. 1B are a network interface 107, input module 108, camera interface 109, read only memory (ROM) 110, random access memory (RAM) 111, storage device 112 and output module 113.

Input module 108 includes plural input devices, for example, a keyboard, a mouse and others. Output module 113 includes a monitor, printer and other similar devices.

CPU 106 can access data files, application program files, and computer executable process steps embodying the present invention or the like via storage device 112. Storage device 112 can be a hard disk, floppy disk, zip drive, a CD-ROM, or CD R/W (read/write) interface or any other type of standalone or networked media.

Storage device 112 stores operating system program files, application program files, web browsers, and other files. Some of these files are stored using an installation program. For example, CPU 106 executes computer-executable process steps of an installation program so that CPU 106 can properly execute the application program.

RAM 111 interfaces to computer bus 114 to provide CPU 106 with access to memory storage. When executing stored computer-executable process steps from storage device 112 (or via Network connection 103), CPU 106 stores and executes the process steps out of RAM 111.

ROM 110 is provided to store invariant instruction sequences such as start-up instruction sequences or basic input/output operating system (BIOS) sequences.

Camera interface 109 allows computing system 102 to interface with digital camera 101 for receiving digital images and/or for any other camera related functions.

Network interface 107 includes a modem, an integrated services digital network (ISDN) connection, or the like to provide computing system 102 with an Internet connection to the World Wide Web (WWW) or to any other network. The Internet connection allows computing system 102 to download data files, application program files and computer-executable process steps embodying the present invention.

It is noteworthy that the present invention is not limited to the FIG. 1B architecture. For example, notebook or laptop computers, handheld devices, set-top boxes or any other system capable of running computer-executable process steps, as described below, may be used to implement the various aspects of the present invention.

Computer-executable process steps, according to one aspect of the present invention may be performed using the Internet. The following provides a brief description of the Internet:

The Internet connects plural computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language (XML) as published by W3C Consortium, Version 1, Second Edition, October 2000, ©W3C may also be used. The collection of all such publicly available computer files is known as the World Wide Web (WWW).

The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer.

The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs also enable two programs on two separate computers to communicate with each other through simple object access protocol ("SOAP"), extensible markup language ("XML"), and other protocols published by the W3C consortium, incorporated herein by reference in its entirety.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP). It is noteworthy that the invention is not limited to standard WWW or W3C protocols for server access and information exchange.

FIG. 1C shows yet another example of the overall system, according to one aspect of the present invention. In FIG. 1C, server 104 is shown as a web server and database 105 is shown as a SQL (structured query language) database. FIG. 1C also shows the various steps that are used to access database 105. In step 1, a user using a browser submits a URL. In step 2, the web server 104 captures the request, locates and executes the ASP code.

In step 3, during execution of ASP code, SQL code is generated and executed. Database 105 is accessed depending on the request to add, modify or delete a photo or photo-related information.

In step 4, the results are sent to the web server 104 and in step 5, HTML code is sent to the client computing system 102. In step 6, the HTML page is sent to the browser and displayed on computing system 102.

Figure 1D:
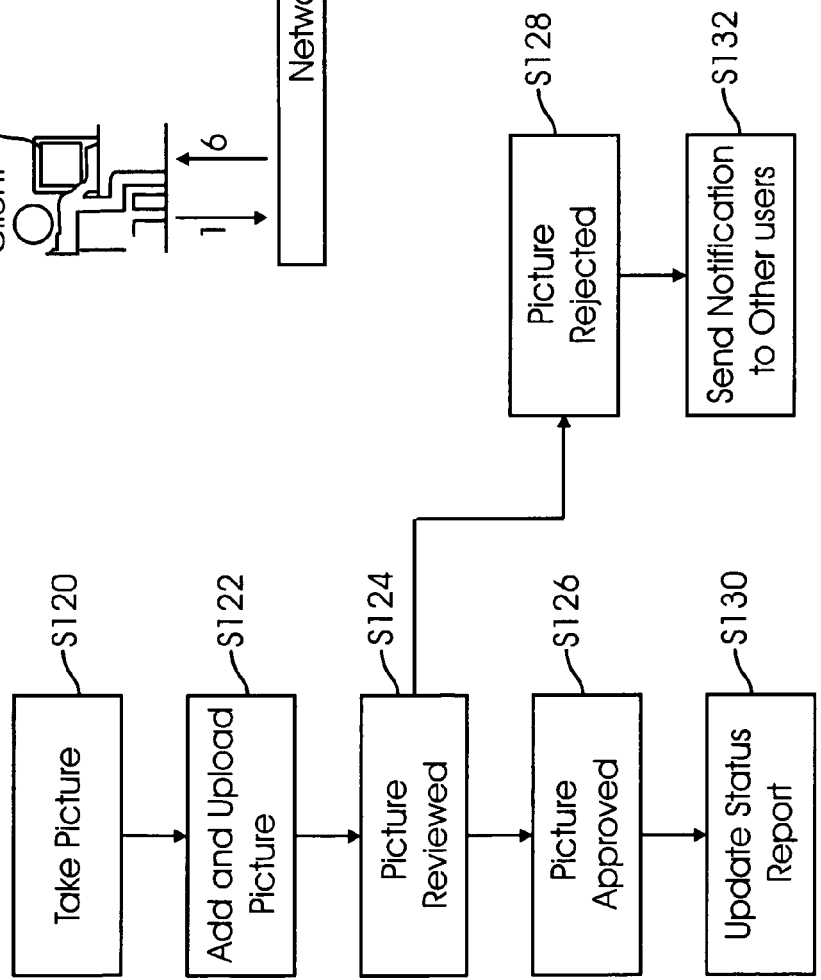
FIG. 1D shows a top-level process steps for approving/rejecting plural digital images, according to one aspect of the present invention.

FIG. 1D shows a top-level block diagram of a process flow diagram for using the database 105, according to one aspect of the present invention. Turning in detail to FIG. 1D, in step S120, a user using a digital camera 101 takes a picture. The user may be someone who is authorized to take the pictures of certain parts, for example, a quality engineer/inspector.

In step S122, the pictures are uploaded and added to database 105, as described below in more detail.

In step S124, the pictures are reviewed by various individuals, where individuals have varying level of authority, for example, person A is allowed to approve and reject a photo, while person B may only be allowed to review the photo.

If the picture is approved in step S126, then the overall status of the database 105 is updated in step S130.

If a picture is rejected in step S128, then a notice (preferably via email) is sent to other individuals in step S132, so that these individuals are aware of the rejection. Details regarding the approval and rejection process are also provided below.

FIG. 1F shows a top-level block diagram of the software management system 132 (also referred to as system 132 interchangeably), according to one aspect of the present invention. System 132 is a part of database 105 (and hence may be referred to interchangeably) and includes a home segment (page) 134, a summary segment 136, add/replace photo segment 138, a reports segment 140, an administration ("admin") segment 142 and a help segment 144.

Home segment 134 allows a user to display the home or default page. The summary segment 136 displays a photo list to a user so that a user can view the photo and the photo related information. The summary segment 136 also allows a user to approve/reject a photo.

Add/replace photo segment 138 allows an authorized user to add/replace a photo.

The reports segment 140 allows an authorized user to run reports on the photo data and the photo requirements.

The admin segment 142 allows an authorized individual/entity to add/modify approvers/reviewers, add/modify photo requirements and other administrative responsibility.

The help segment 144 provides a user guide and other useful information regarding system 132.

The illustration/examples below are based on quality procedures for rocket launches, but they are equally applicable in other industries. Before a rocket is launched, as part of a pre-launch quality process, certain pictures of a rocket assembly/sub-assembly are taken and then viewed by certain individuals. All the pictures must be approved before the rocket can be launched. The present system improves the overall efficiency of this process.

In one aspect of the present invention system 132 is a web based software application for storing, cataloging, viewing and approving (or rejecting) images taken of certain parts and assemblies. System 132 allows a user to add and approve (or reject) digital images and add/update pertinent data for creating a repository of close out photos.

System 132 can be developed using programming languages HTML and Microsoft Active Server Pages (ASP). ASP is a scripting language that allows several languages to send/receive data to/from a web site. System 132 can also use JavaScript (on the client side) and VBScript (on the server side). Photos can be uploaded to database 105 via Perl Script.

It is noteworthy that the present invention is not limited to any particular programming language.

Figure 2A:
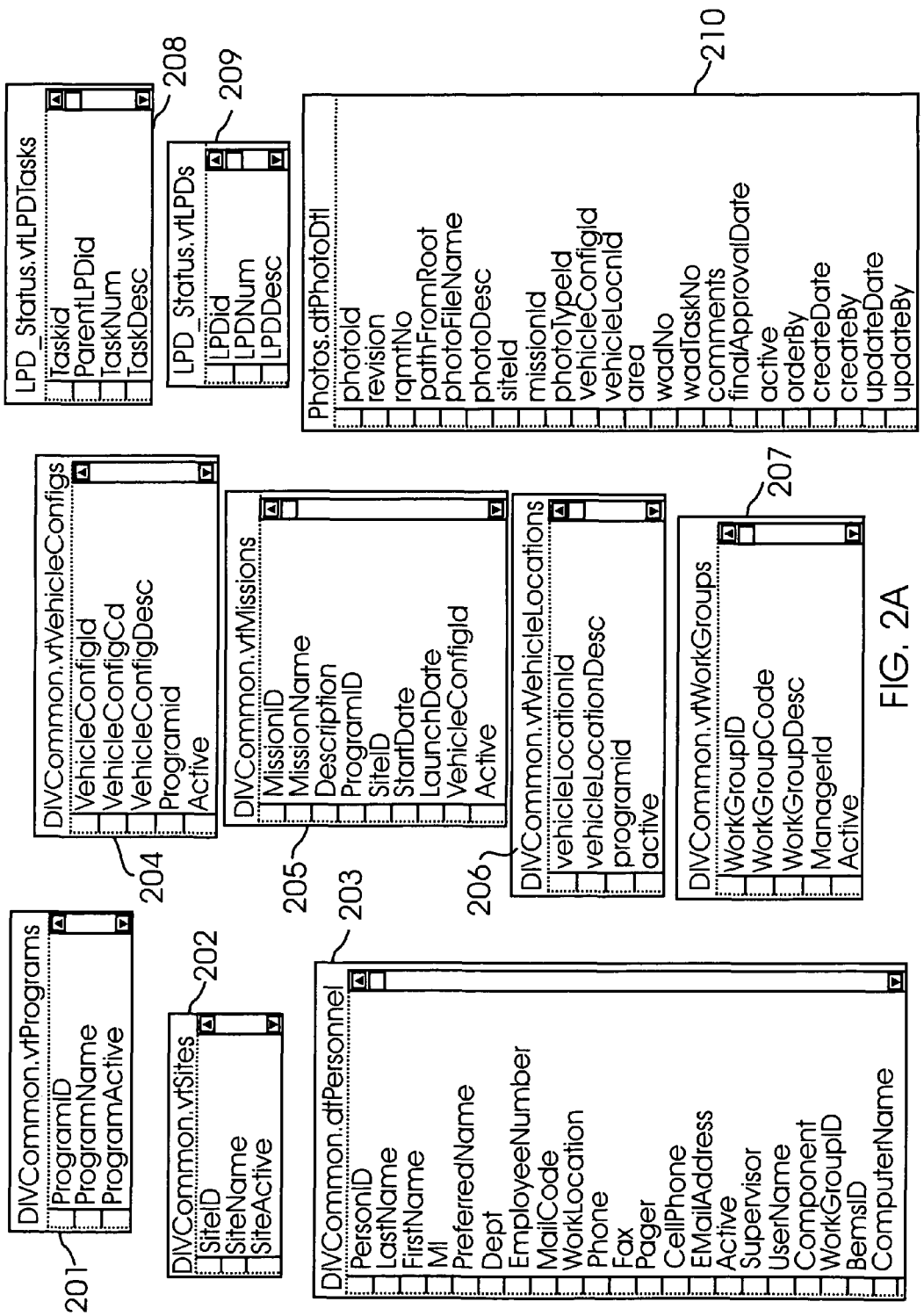
FIG. 2 is a block diagram of a system/database, according to one aspect of the present invention.
Figure 2B:
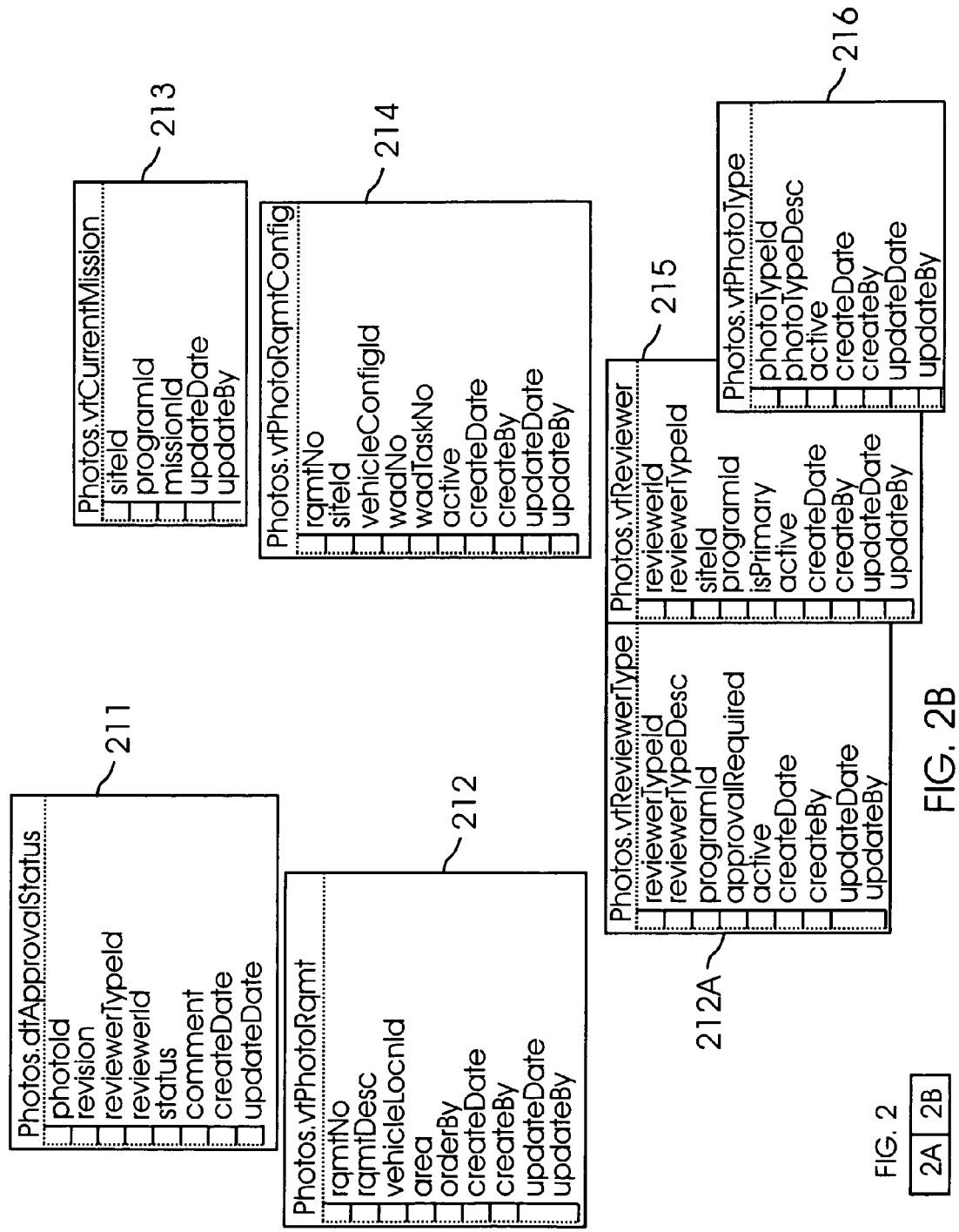

FIG. 2 shows an example of database 105 that can be stored as a SQL database. Database 105 includes various sub-modules that can be accessed through a single SQL Server account. Database 105 includes various tables 201-216 that are described below. The ".dt" tables are data tables (for example, tables 203, 210 and 211). Tables with extension ".vt" are look up tables for various drop down menus, for example, 201, 202, 204, 205, 206, 207, 208, 209, 212, 212A, 213, 214, 215 and 216. The abbreviation "LPD" means launch process document and "WAD" means work authorization document.

Table 201 is a look up table that provides Program information, for example, program identifier, name and if the program is active or not. Program in this context means the overall project.

Table 202 provides site information, for example, site identifier, site name and if a site is active or not.

Table 203 provides information about the various users.

Table 204 provides information on a vehicle configuration.

Table 205 provides details for a mission.

Table 206 provides information on vehicle location, i.e. the location from where pictures are taken.

Table 207 provides information on a particular work group.

Table 208 provides information on various LPD tasks and table 209 provides information on each LPD.

Table 210 is a data table that includes various fields for describing photos.

Table 211 provides information on approval status for photos, while table 212 provides information on photo requirements.

Table 212A provides information on reviewer type, while table 213 provides information on a current mission.

Table 214 provides information on photo requirement configuration, while table 215 provides information on photo reviewer.

Table 216 provides information on photo type.

FIG. 3 shows a process flow diagram that allows a user to log into system 132. A user 301 initiates a session 302 via a log in screen (module) 303. Login module 303 interfaces with table 203 (DivCommon.dtPersonnel) that maintains information on all database 105 users. Log in module 303 allows an authorized user to access system 132 depending on the user's authority level.

FIG. 4 shows a block diagram for adding/replacing a photo using module 138. Various tables of FIG. 2 are used to accomplish this function. User, mission and site information is provided by tables 203, 205 and 202 respectively. The actual vehicle location (i.e. the location of the vehicle that is photographed) is obtained from table 206. The photo details are provided by table 210, while the photo configuration and requirements are provided by tables 214 and 212, respectively. Table 216 provides "Photo type" information. Table 213 provides information on a current mission and table 209 provides information on the LPD.

Figure 5:
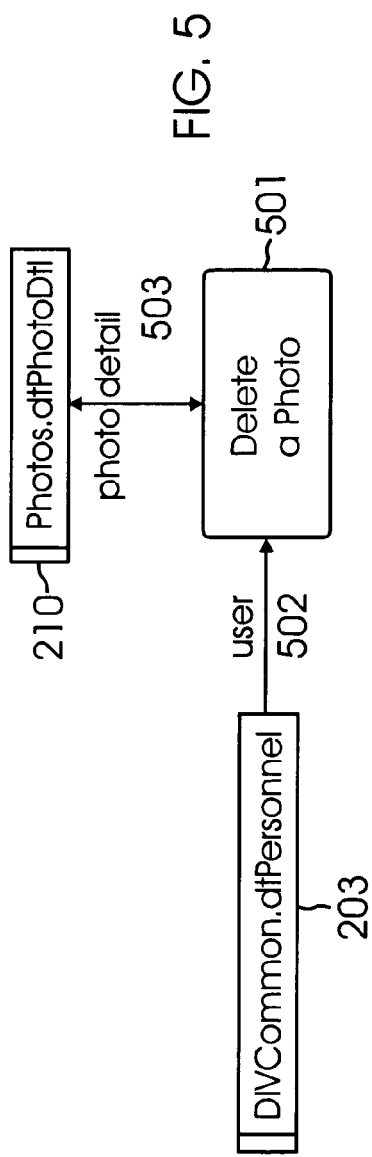
FIG. 5 shows an example for deleting a digital image, according to one aspect of the present invention.

FIG. 5 shows a flow diagram for deleting a photo 501 from database 105. User information is received from table 203. Photo details 503 are obtained from table 210. If the user 502 has the authority then the photo is deleted.

Figure 6:
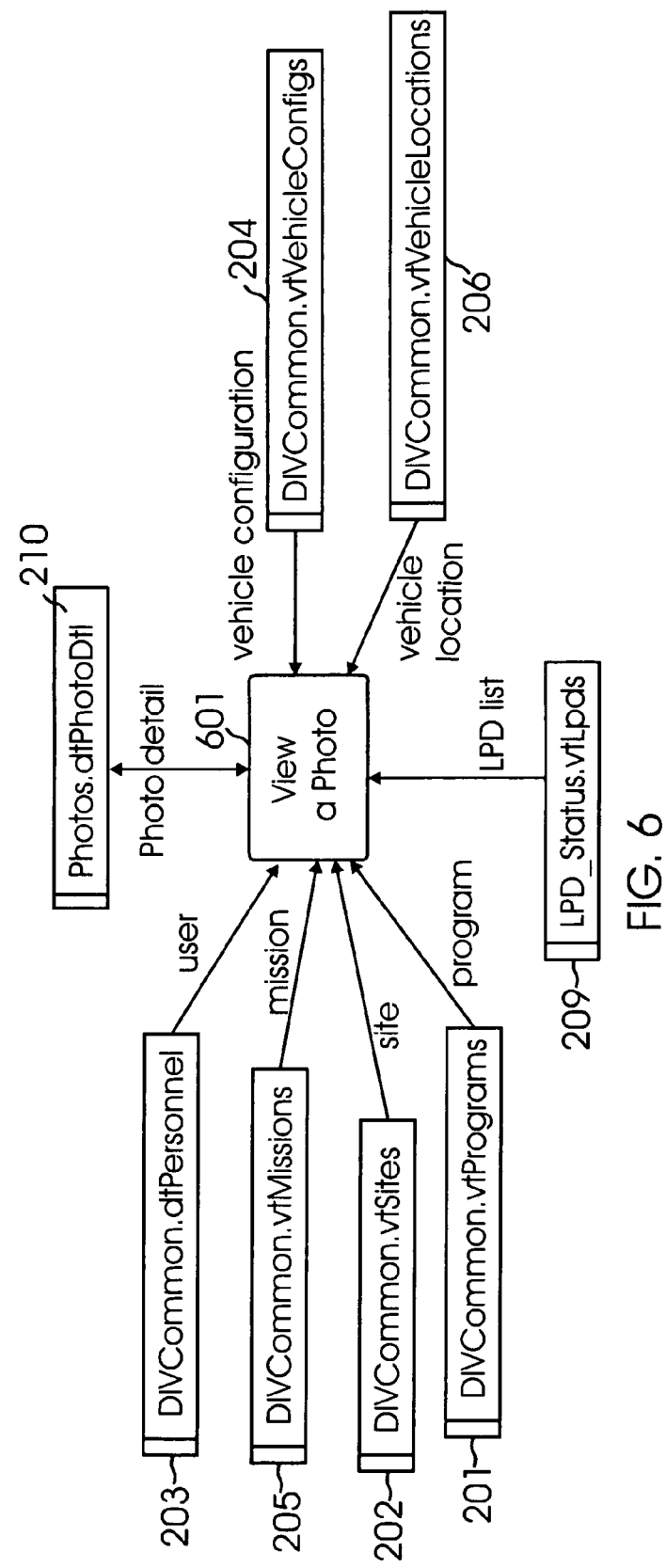
FIG. 6 shows an example for viewing a digital image, according to one aspect of the present invention.

FIG. 6 shows a flow diagram for viewing a photograph 601 in database 105 (using summary module 136). User information is received from table 203, while mission information is received from table 205. Site and program information is received from table 202 and 201, respectively. Photo details are obtained from table 210. Vehicle configuration and location is obtained from tables 204 and 206.

Figure 7:
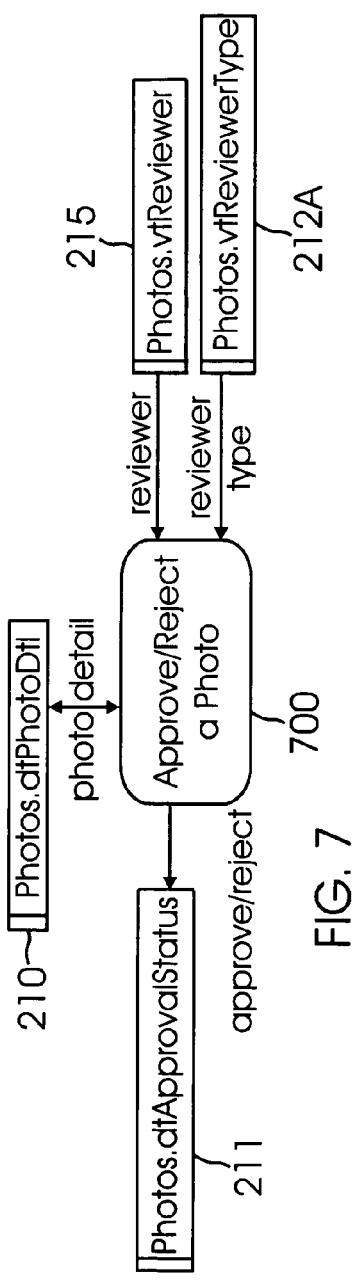
FIG. 7 shows an example of how a user can approve/reject a digital image, according to one aspect of the present invention.

After reviewing a photo, a user can approve or reject it. This process flow 700 is shown in FIG. 7. The user obtains photo details from table 210, while reviewer and reviewer type (as described below in detail) information is obtained from tables 215 and 212A. Thereafter, the digital photo is accepted or rejected. The status is updated by updating table 211.

Figure 1E:
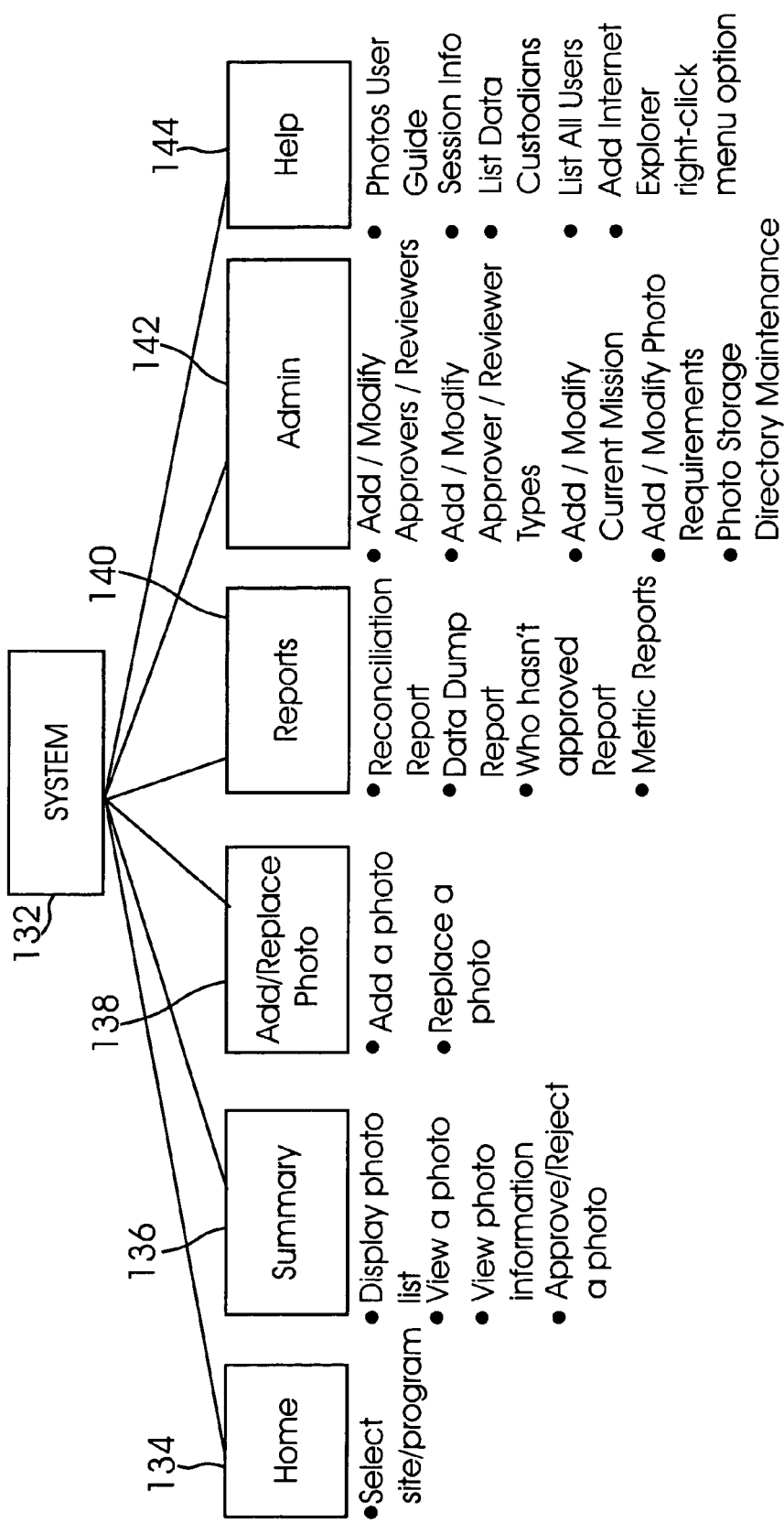
FIG. 1E shows a top-level block diagram of a system for managing/storing digital images, according to one aspect of the present invention.
Figure 8:
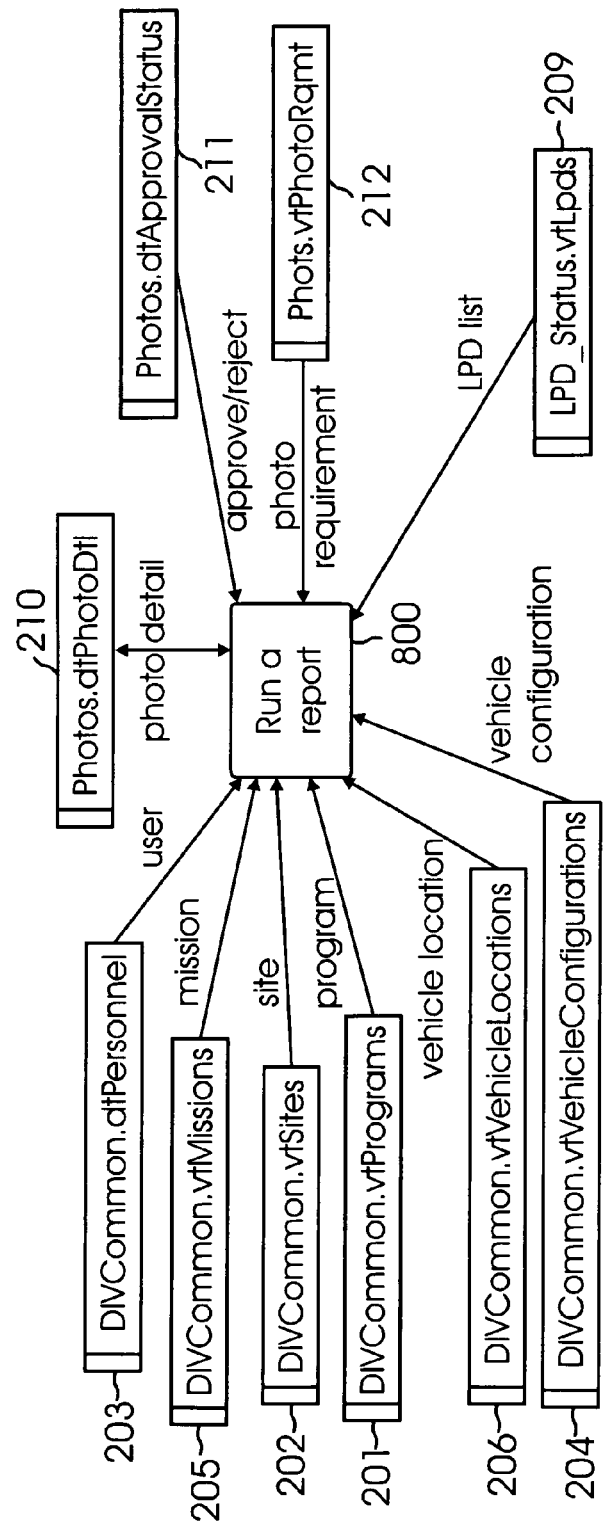
FIG. 8 shows an example for running a report, according to one aspect of the present invention.

FIG. 8 shows a process flow diagram to run a report 800 using report module 140 (FIG. 1E), according to one aspect of the present invention. Information from various tables is compiled to run a report. User information is obtained from table 203, mission, site, program, vehicle location, vehicle configuration and LPD information is obtained from tables 205, 202, 201, 206, 204 and 209 respectively. Approval/rejection status is obtained from table 211. Photo requirements are obtained from table 212.

Figures 9, 10:
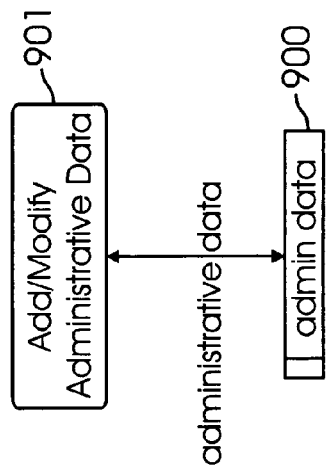

FIG. 9 shows a process flow diagram that allows a user to add/modify administrative look up table data 901 by interfacing with admin data tables 900. Typically, the user is a data custodian. Data that can be modified includes photo requirements, the current mission, reviewers and reviewer types.

System 132 (and database 105) is secured and only authorized users can access it. FIG. 10 shows a screen shot where user access is authorized by system 132 using table 203 that includes information about every system 132 user.

FIG. 11 shows an example of a summary view 902 (via summary segment 136), according to one aspect of the present invention. The view provides various levels of details, based on user selection. "Mission" drop down box 902H allows a user to select a particular mission. Missions that have photos are listed and the photos for a particular mission are displayed. This box can be used in conjunction with vehicle location box 902J, "sort by box" 902L and the "find" box 902M. The find box 902M allows a user to conduct a search for photos based on key words. Box 902L allows a user to sort data while box 902J allows the user to select the location of the vehicle whose pictures have been taken. Upon selection, only location specific photos are displayed.

Approval status box 902K allows a user to display photos that have been reviewed, approved, rejected, not reviewed or for all "statuses".

Various types of users can use system 132, for example, a user can be an "approver" that approves a photo, a reviewer that reviews a photo but cannot approve or reject, a data custodian that is neither an approver or reviewer, read-write users that are not approvers or reviewers; and read-only users.

The user can view a photo by clicking on the camera icon (shown as 902N). In one aspect, the picture is displayed in a new browser window. The user can also open the photo in a photo editor.

Each photo has a requirement number (shown in column 902A) with a vehicle location (column 902B). The photo description in column 902C provides a brief description of the photo.

Column 902D shows the reviewer type with the title. Column 902E and 902F allow a user to approve or reject a photo, as described below. Column 902G shows if a photo has final approval.

By clicking on the link 902C, the photo details are displayed, as shown in FIG. 12 (described below). The user can view photo approval, rejection and comments about the photo.

FIG. 12 shows an example 1200 of the photo details displayed after a user clicks on the "photo description" link. All basic photo information (for example, requirement number, mission, final approval date, site, program, configuration, work area etc) is shown in segment 1203. The approvers 1201 and reviewers 1202 are also shown under the approval status section.

Figures 13, 14:
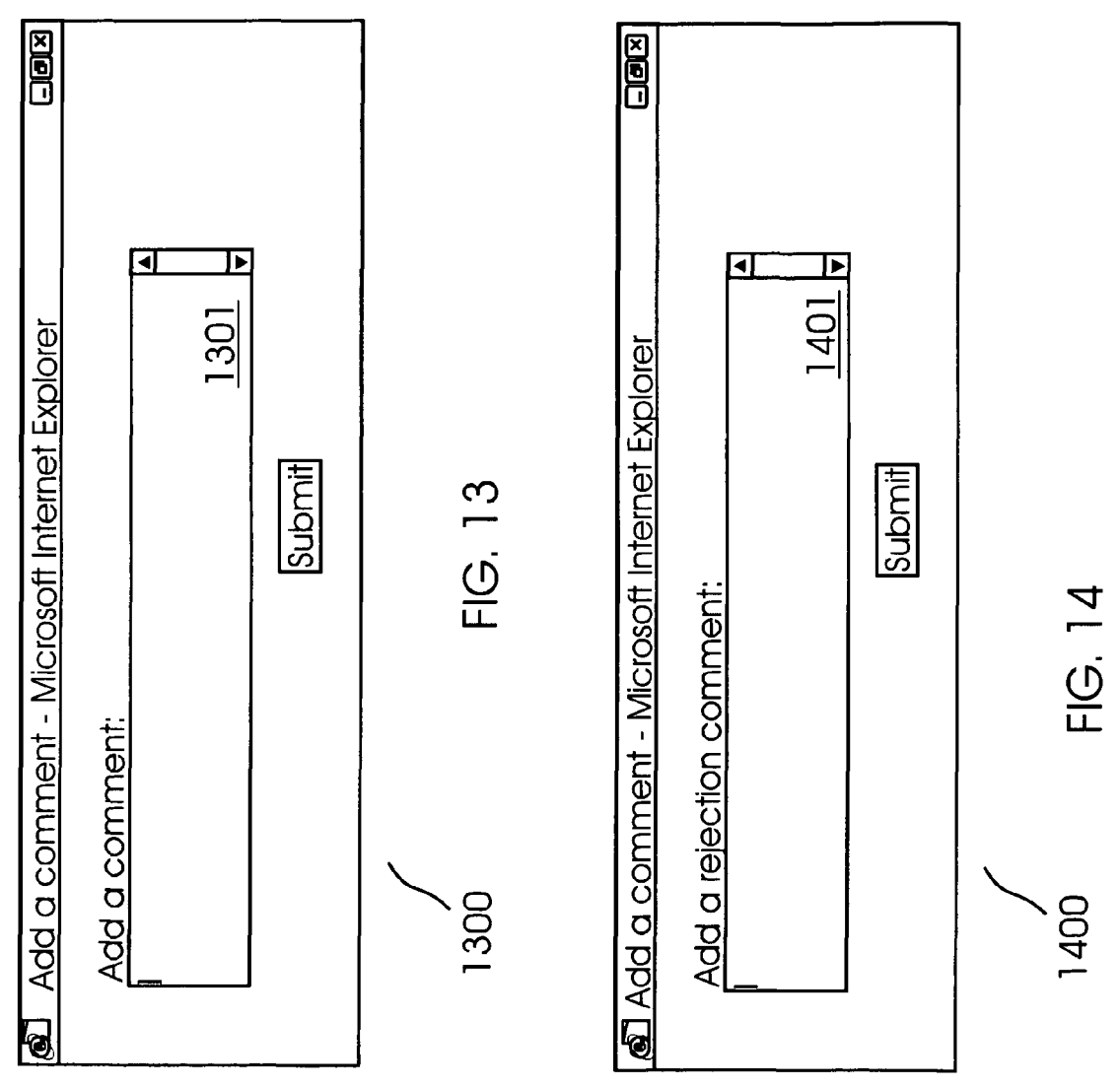

FIG. 13 shows a screen shot 1300 that allows a user to approve a photo and add a comment in window 1301.

FIG. 14 shows a screen shot 1400 with a window 1401 that allows a user to reject a photo.

Figure 15:
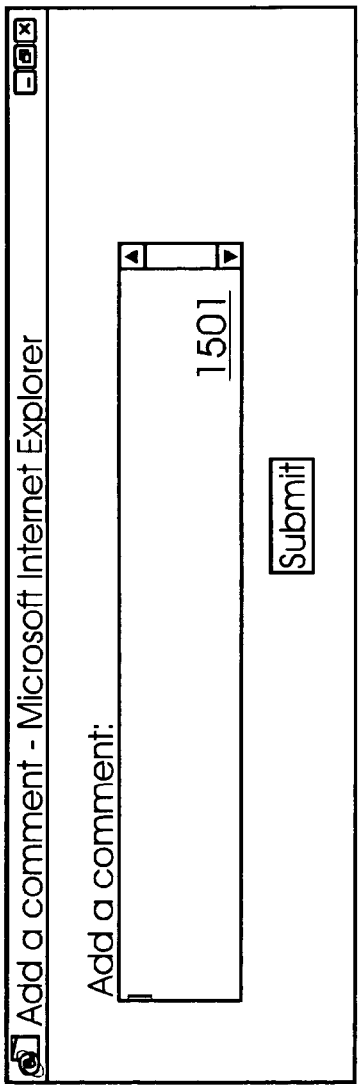

FIG. 15 shows an example of a screen shot 1500 where a user can add a comment to a photo in window 1501 without approving or rejecting a photo.

Figure 16:
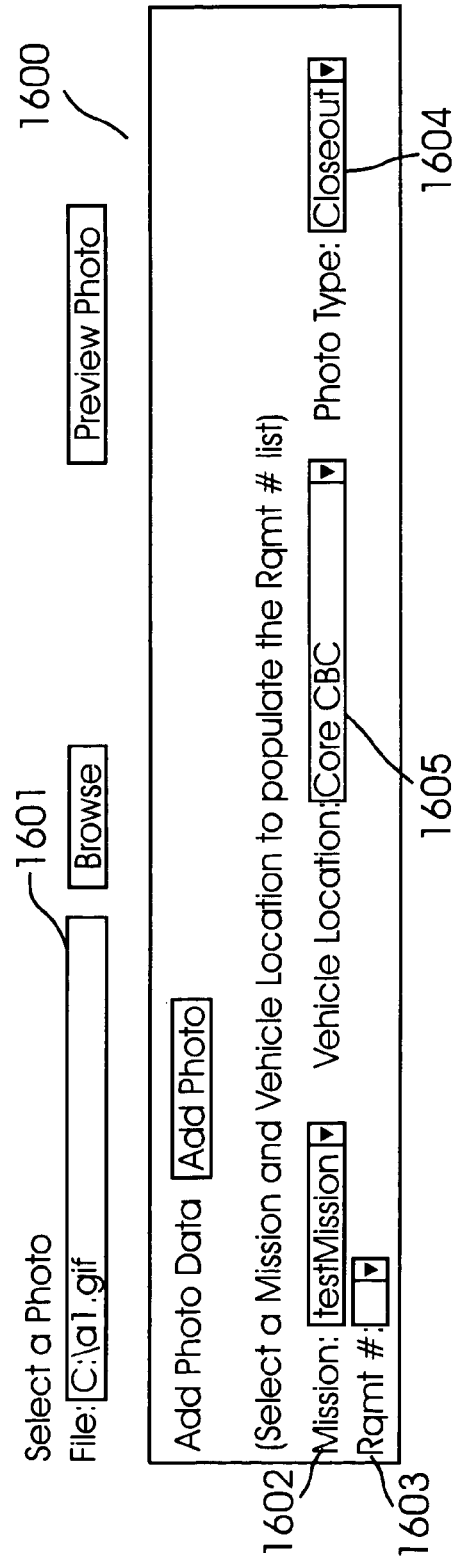

FIG. 16 shows a screen shot 1600 that allows a user to add a photo, according to one aspect of the present invention. "File" 1601 allows a user to enter the photo file information for the photo that is to be uploaded. The mission drop down box 1602 allows the user to specify the mission and the requirement box 1603 allows a user to select pre-loaded requirements. Box 1604 allows the user to select the type of the photo, i.e., "closeout". The vehicle location is added from box 1605.

Once the user has selected the proper fields, the user is given an option to add a photo.

FIG. 16A shows a screen shot 1600A that allows a user to replace an existing photo, according to one aspect of the present invention. "File" 1601A allows a user to enter the photo file information for the photo that is to be uploaded. The mission drop down box 1602A allows the user to specify the mission and the requirement box 1603A allows a user to select pre-loaded requirements. Box 1604A allows the user to select the type of the photo, i.e., "closeout". The vehicle location is added from box 1605A. The user can view the existing photo from camera icon 1606A

Once the user has selected the proper fields, the user is given an option to replace a photo.

The admin module 142 provides various administrative functions as shown in the screen shot 1700 of FIG. 17. It allows an authorized user to add/modify approvers and reviewers 1701, add/modify information regarding a mission 1702 add/modify requirements 1703 and storage maintenance functionality 1704 (for example, adding a photo storage directory).

FIG. 18 shows a screen shot 1800 where a user can add/modify an approver/reviewer. This screen is displayed when a user clicks on the link 1701 (Add/Modify Approvers and Reviewers). Screen 1800 has action buttons 1801 (to add an approver/reviewer), 1805 (to delete an approver/reviewer) and 1806 (to edit an approver/reviewer). Column 1802 shows the approver/reviewer type and column 1803 shows if an approver/reviewer is a primary approver/reviewer.

FIG. 19 shows a screen shot 1900 for adding an approver/reviewer after a user clicks on button 1801. The user can specify the approver/review type and designate the approver/reviewer to be the primary approver/reviewer by using the pull down menu. The pull down box 1901 is populated with user names from table 203 (FIG. 2). The approver/reviewer type 1902 information comes from table 212A. "Is primary" field 1903 allows designation of a primary approver/reviewer. The submit button adds the approver/reviewer.

FIG. 20 shows a screen shot 2000 after a user selects the edit button 1806. In this screen, the system allows an authorized individual to change the approver/reviewer data.

FIG. 21 shows a list 2100 of various approver/reviewer types for a particular program. This can be accessed via "Add/Modify Approver Types" link from FIG. 17. An administrator typically performs this function. Add button 2101 allows addition of approver/type for a program, while edit button 2102 allows one to change the approver/reviewer type. By clicking on button 2101, screen shot 2200 is shown (FIG. 22). This allows addition of an approver/reviewer type for a program. Once this is set, clicking on the edit button 2102 can modify the data, as shown in FIG. 23.

FIG. 24 shows a screen shot 2400 for adding photo requirements for a particular program. Action button ("Add") 2401 allows addition of photo requirements, while edit button 2402 allows modification of the requirements and delete button 2404 allows deletion of a requirement. The Find 2403 option allows one to conduct search for photo requirements in the photo requirements master list.

FIG. 25 shows a screen shot 2500 after the add button 2401 is selected (or clicked on). The user adds the requirement number, selects vehicle location and work area, and inserts the description. The applicable task, vehicle location and other program related information is added. FIG. 26 shows a screen shot 2600 to modify the photo requirements. The various fields are self-explanatory.

FIG. 27 shows a screen shot 2700 that lists all the mission photo requirements. This list is maintained in table 212.

FIG. 28 shows a screen shot 2800 that allows a user to load plural photo requirements for a mission. Typically, a data custodian performs this function.

Database 105 provides different reports using reports module 140. FIG. 29 shows an example of how different reports can be generated by selecting a "reconciliation report" 2901, a "data dump report" 2902, a "who hasn't approved report" 2903 option and a "mission metric report" 2904 option.

Reconciliation report 2901 allows a user to create a report listing all photo requirements for a mission, vehicle location and a work authorizing document number (shown as WAD Number). As shown in FIG. 29, reconciliation report can be based on all photo requirements, photo requirements already satisfied, photos rejected by reviewers, photo requirements without final approval and photos approved by a reviewer without final approval. This allows a user (for example, a program manager) to get a snap shot of the final stages of the launch.

Figure 30A:

The data dump report 2902 allows a user to create a report with all photo data for a specific mission, vehicle location and work authorizing document number (shown as WAD number). FIG. 30 shows an example of a data dump report 3000.

The "Who Hasn't Approved Report" 2903 allows the user to create a report with photos that have not yet been approved for a specific mission, vehicle location, work authorizing document number (shown as WAD number) and reviewer type. FIG. 31 shows an example of this report 3100.

The mission metric report 2904 allows a user to create a report with the count, per reviewer type, of all photos not yet approved. FIG. 32 shows an example of a mission metric report 3200.

The following provides a listing of various files that can be used to implement system 132, according to one aspect of the present invention.

JavaScript Library

The following provides a listing of common JavaScript functions used through out the various ASP pages. Listed below are headers of the functions that describe the arguments, return value and description of the function.

```
//***************************************************************
// Function:    isEmpty
//
// Arguments:   str - string to be tested
//
// Return:      true/false
//
// Purpose:     Determines if the string is an empty string.
//***************************************************************
//***************************************************************
// Function:    isPosInteger
//
// Arguments:   val - value to be tested
//
// Return:      true/false
//
// Purpose:     Determines if the value is a positive integer.
//***************************************************************
//***************************************************************
// Function:    setFormAction
//
// Arguments:   form object
//              action string to be set
//
// Return:      true
//
// Purpose:     Sets the action property of the passed form
//***************************************************************
//***************************************************************
// Function:    isDate
//
// Arguments:   pDate - the date string.
//
// Return:      true/false
//
// Purpose:     Determines if the date is a valid date.
//***************************************************************
//***************************************************************
// Function:    formatDate
//
// Arguments:   form object
//
// Return:      date in the format "mmm d yyyy" (eg. Jan. 1, 2001)
//
// Purpose:     Formats a date into a form which can be later
//              interpreted by the Date object methods.
//***************************************************************
```

```
-continued

//***************************************************************
// Function:    compareDates
//
// Arguments:   dt1 - the first date string
//              dt2 - the second date string
//              oper - operator (<, <=, >, >=,==)
//
// Return:      true/false
//
// Purpose:     compares the dates based on the operator supplied.
//***************************************************************
//***************************************************************
// Function:    isUsingIE
//
// Arguments:   pstrMsg - message to display
//
// Return:      true/false
//
// Purpose:     Determines if the user is running Internet Explorer.
//              Images can only be displayed using IE.
//***************************************************************
//***************************************************************
// Function:    createUploadDirForCloseout
//
// Arguments:   pintMsnId = missionId
//              pstrMsnDesc = mission description
//
// Return:      upload directory string
//
// Purpose:     Creates the upload directory string for the file
//              (minus the base root directory which is stored
//              in an application variable).
//***************************************************************
//***************************************************************
// Function:    viewPhotoInNewWin
//
// Arguments:   the file path
//
// Return:      true/false
//
// Purpose:     given a full path & file name, displays the photo.
//***************************************************************
//***************************************************************
// Function:    clearCombo
//
// Arguments:   obj - the object to be cleared.
//
// Return:      true
//
// Purpose:     clear out any given combo box.
//***************************************************************
//***************************************************************
// Function:    trim
//
// Arguments:   value - the value to trim.
//
// Return:      the trimmed value
//
// Purpose:     trims leading & trailing spaces from a string.
//***************************************************************
//***************************************************************
// Function:    selectAllCheckboxes
//
// Arguments:   the button object
//              the string in the checkbox name
//
// Return:      true
//
// Purpose:     select (or deselect) all the checkboxes in a form
//              for a specified string in the name of the checkbox.
//***************************************************************
```

(b) Field Filters

This file contains common functions used to dynamically alter the contents of one dropdown when a value is chosen from another dropdown box. It uses JavaScript files containing the array data. These files are generated on a nightly basis running from jobs on web server 104. Listed below are the headers of the functions that describe the arguments, return value, and description of the function:

```
//***************************************************************
// Function:   wadNoSelected
//
// Arguments   pobjWadNo - wadNo object calling the function
//
// Return:     true
//
// Purpose:    OnChange event for the wadNo dropdown box to change
//             the values in the wadTaskNo dropdown box.
//***************************************************************
```

(c) ASP Library

This file contains common VBScript functions used throughout the ASP pages. Listed below are the headers of the functions that describe the arguments, return value, and description of the function:

```
'***************************************************************
' Subroutine: isAccessAuthorized
'
' Arguments:  pintLvl - the permission level to check. if zero,
'             all levels have access
'
' Purpose:    verifies the session is active and the user
'             has the proper permissions to view the page.
'***************************************************************
'***************************************************************
' Subroutine: cleanUpObjects
'
' Arguments:  pconn - the connection (by reference)
'             precTemp - the recordset (by reference)
'
' Purpose:    closes the recordset & connection.
'***************************************************************
'***************************************************************
' Function:   getCleanUserNm
'
' Arguments:  none.
'
' Return:     strUserNm - user name
'
' Purpose:    Gets the user name of the user currently logged in
'             to the browser. IE is in the format domain\userNm,
'             while Netscape is userNm only. If IE, strips off
'             the domain to return the simple user name.
'***************************************************************
'***************************************************************
' Function:   isValidUser
'
' Arguments:  none.
'
' Return:     flgRtn - true/false
'
' Purpose:    Determines if the user is a valid user for the
'             application.
'***************************************************************
'***************************************************************
' Subroutine: setReviewerSessionInfo
'
' Arguments:  none.
'
' Return:     n/a
'
' Purpose:    Sets the reviewer/approver session information
'             for the current user.
'             The generic user session variables are set in
'             default.asp and isValidUser
'***************************************************************
```

-continued

```
'***************************************************************
' Function:   populateDropDown
'
' Arguments:  pstrSQL - SQL string. the first field in the select
'                       must be the code/id field. this will be
'                       used as the option value, the rest of
'                       the fields will show up in the dropdown
'                       each field separated by a comma.
'             pstrName - name of the select tag
'             pstrSelect - value to "select"
'             pstrEvent - event for the select box
'             pflgInitValue - whether to add the "0" value to the list.
'             pstrInitValue - string to display for the "0" value
'                       (if applicable, otherwise calling function sends
'                       " " as argument value).
'
' Return:     strRtn - string with the entire select tag
'
' Purpose:    Creates a select tag and adds options based
'             on the results of the SQL query.
'***************************************************************
'***************************************************************
' Function:   populateDropDownOptionsOnly
'
' Arguments:  pstrSQL - SQL string, the first field in the select
'                       must be the code/id field. This will be
'                       used as the option value. The rest of
'                       the fields will show up in the dropdown
'                       each field separated by a comma.
'             pstrSelect - value to "select"
'             pflgInitValue - whether to add the "0" value to the list.
'             pstrInitValue - string to display for the "0" value
'                       (if applicable, otherwise calling function sends
'                       " " as argument value).
'
' Return:     strRtn - string with the entire select tag
'
' Purpose:    Creates options based
'             on the results of the SQL query.
'***************************************************************
'***************************************************************
' Function:   populateYesNoDropDown
'
' Arguments:  pstrName - name to be given to the select tag
'             pintValue - default value (1 or 0)
'
' Return:     strRtn - string holding the select tag for the
'                      Yes/No dropdown box.
'
' Purpose:    Build a yes/no dropdown box using "Yes" & "No".
'***************************************************************
'***************************************************************
' Function:   populateSortByDropDown
'
' Arguments:  pstrName - name to be given to the select tag
'             pflgInitValue - whether to add the "0" value to the list.
'                       1 = add the "0" value
'                       0 = don't add the "0" value
'             pstrSelectValue - initial value to select
'
' Return:     strRtn - string holding the select tag for the
'                      Sort By dropdown box.
'
' Purpose:    Build a sortBy dropdown box.
'***************************************************************
'***************************************************************
' Function:   isEmptyOrZero
'
' Arguments:  pValue - value to check.
'
' Return:     flgRtnVal - true/false
'
' Purpose:    Determines if the value passed is an empty string
'             or the integer zero. Especially helpful when
'             checking to see if data was entered in a form field.
'***************************************************************
```

```
' Function:    hasNonZeroValue

' Arguments:   pValue - value to check.

' Return:      flgRtnVal - true/false

' Purpose:     Determines if the value passed has a value other
              than zero. Especially helpful when
              checking to see if data was entered in a form field.
'****************************************************************
'****************************************************************
' Function:    isChecked ' Arguments:   pstrVal - Value of Checkbox ' Return:      intChecked - 1 = True; 0 = False ' Purpose:     converts the text value of a CheckBox into
              a logical true/false as 1/0.
'****************************************************************
'****************************************************************
' Function:    getDescFromId ' Arguments:   pstrTable - table name
              pstrDescField - description field name
              pstrIdField - id field name
              pintId - id
              pflgString - true if the id is a string
                  (used for quoting the value)

' Return:      description of the record at the id

' Purpose:     Returns the description of a lookup record at
              the given id.
'****************************************************************
'****************************************************************
' Function:    getCurrentMission ' Arguments:   pintSiteId - site id
              pstrDesc - variable to hold the missionDesc return
              value (byRef)

' Return:      id of the current mission
              by Ref: desc of the current mission ' Purpose:     Returns the id and, by reference, the description
              of the current mission.
'****************************************************************
'****************************************************************
' Function:    getTaskForWad ' Arguments:   pstrWadNo - WAD number
              pstrWadIndex - WAD index #
              pintProgramId - program ' Return:      Wad task ' Purpose:     Returns the appropriate Wad Task description
              for the Wad number, the task index, and the program.
              Task# may not match task index from LpdStatus
              for Delta II so return the task description, else
              return "T<index>".
'****************************************************************
'****************************************************************
' Function:    getSiteIdForMsnId ' Arguments:   pintId - id ' Return:      the siteId for the mission ' Purpose:     Returns the siteId for the mission.
'****************************************************************
'****************************************************************
' Subroutine:  displayDirs ' Arguments:   pobjFS - file system object
              pstrPath - path to collect sub-directories of
              pintDepth - level (used for formatting output)

' Return:      n/a

' Purpose:     Displays the directory and sub-directories tree
              starting at a root path. This is a recursive
              subroutine.
'****************************************************************
'****************************************************************
' Function:    sendEmailForReject ' Arguments:   pintPhotoId - the photo id
              pintRev - the photo revision
              pintReviewerId - the person rejecting the photo ' Return:      strRtn - an empty string for success & an error for
                      failure.

' Purpose:     sends an email to notify the other photo reviewers
              that a photo has been rejected. only approvers
              generate and get the email, reviewers do not.
'****************************************************************
'****************************************************************
' Function:    formatBoolean ' Arguments:   pflgValue - true/false value to format ' Return:      a string - "Yes" or "No"

' Purpose:     Returns a Yes/No string for a
              boolean (true/false) varible.
'****************************************************************
'****************************************************************
' Subroutine:  processPhotoRqmtConfigRecord ' Arguments:   pstrAction - action (add or update)
              pcmdTemp - command object (by reference)
              pstrRqmtNo - requirement number
              pintVehicleConfigId - vehicle config id
              pstrWadNo - wad number
              pstrWadTaskNo - wad task number
              pintActive - active indicator ' Purpose:     inserts/updates a vtPhotoRqmtConfig record.
'****************************************************************
```

Connection Library

This file contains common functions used to execute SQL statements and stored procedures. Listed below are the headers of the functions that describe the arguments, return value, and description of the function:

```
'****************************************************************
' Subroutine:  executeSQL ' Arguments:   pconn1 - connection to the database. this
                      variable is "passed by reference" so changes
                      in this function affect the value of the
                      variable in the calling function.
              precTemp - recordset to store the results. this
                      variable is "passed by reference" so changes
                      in this function affect the value of the
                      variable in the calling function.
              pstrSQL - SQL string, the SQL statement to be
                      executed.

' Purpose:     Opens the connections, creates the objects, and
              executes the SQL statement. It is the responsibility
              of the caller to delete the connection and
              record set objects. The connection and record set
              objects are passed by reference, so updates that
              occur in this function are able to be seen in
              the calling function
'****************************************************************
```

-continued

```
' Subroutine:  createConnForStoredProc
'
' Arguments:   pconn1 - connection to the database. this
'                       variable is "passed by reference" so changes
'                       in this function affect the value of the
'                       variable in the calling function.
'              pcmdTemp - command object for the stored procedure.
'                       this variable is "passed by reference" so changes
'                       in this function affect the value of the
'                       variable in the calling function.
'              precTemp - record set to store the results. this
'                       variable is "passed by reference" so changes
'                       in this function affect the value of the
'                       variable in the calling function.
'
' Purpose:     Opens the connections and creates the objects
'              so that a stored procedure can be called.
'              It is the responsibility of the caller to delete
'              the connection, command object and
'              record set object. The connection, command and record set
'              objects are passed by reference, so updates that
'              occur in this function are able to be seen in
'              the calling function
'*************************************************************
Display Formats
This file contains common functions used to format the photo data for
output to the screen. Listed below are the headers of the functions that
describe the arguments, return value, and description of the function:
'*************************************************************
' Function:    formatPhotoDetails
'
' Arguments:   precTemp1 - recordset w/ selected photo(s) (by reference)
'              pstrRptType - rpt type (calling page, SUMMARY,DD,
'                       REC,WHA)
'              pstrSubRptType - rpt subtype for REC rpts (SATISFIED,
'                       REJECTED,etc)
'              pintCnt - record count (by reference)
'
' Return:      a string with the details data
'
' Purpose:     Formats the photo details for all records in
'              the supplied record set so they can be displayed
'              on the page.
'*************************************************************
'*************************************************************
' Function:    formatPhotoDetailsLite
'
' Arguments:   precTemp1 - recordset w/ selected photo(s) (by reference)
'              pstrRptType - rpt type (calling page, SUMMARY,DD,
'                       REC,WHA)
'              pstrSubRptType - rpt subtype for REC rpts (SATISFIED,
'                       REJECTED,etc)
'              pintCnt - record count (by reference)
'
' Return:      a string with the details data
'
' Purpose:     A condensed version of formatPhotoDetails. Formats
'              the photo details for all records in
'              the supplied record set so they can be displayed
'              on the page.
'*************************************************************
'*************************************************************
' Function:    formatApprovalStatusForDetails
'
' Arguments:   precTemp - recordset w/ approval Status data
'              pstrRptType - rpt type (calling page, SUMMARY,DD,
'                       REC,WHA)
'              pstrSubRptType - rpt subtype for REC rpts (SATISFIED,
'                       REJECTED,etc)
'
' Return:      a string with the approvaiStatus data
'
' Purpose:     Formats the approval Status data for all records in
'              the supplied record set so they can be added to
'              the photo details and displayed on the page.
'              Called from function format Photo Details.
'*************************************************************
```

```
'*************************************************************
' Function:    formatPhotoRqmts
'
' Arguments:   precTemp1 - recordset w/ selected photo(s) (by reference)
'              pstrRptType - report type; values are:
'                       DD -data dump
'                       REC - reconciliation rpt
'                       WHA - "who hasn't approved"
'              pintCnt - record count (by reference)
'
' Return:      a string with the details data
'
' Purpose:     Formats the photo requirements for all records in
'              the supplied record set so they can be displayed
'              on the page.
'*************************************************************
```

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A system for managing a plurality of digital images, comprising:
  a computing system; and
  a server configured to access a database, the database configured to store the plurality of digital images and wherein the database includes a management system with a user interface that is configured to receive commands from the computing system and permit selective access to a plurality of users based on user authority, from the computing system, to
  view the plurality of digital images stored in the database,
  indicate approval or rejection of a digital image based on user authority, wherein the indication of approval or rejection of the digital image is stored in the database, and
  view a status of whether users have indicated approval or rejection of any of the plurality of digital images, based upon the indication of approval or rejection of the digital image stored in the database.

2. The system of claim 1, wherein a summary segment of the management system allows a user to view a list of plurality of digital images, view an actual image, view image information and approve or reject a digital image from the computing system.

3. The system of claim 1, wherein an administration segment of the management system allows an authorized user to add a new user from the computing system, wherein the new user can be an approver of a digital image having an authority to approve or reject the digital image, or the user is a reviewer who is allowed to review the digital image without having the authority to approve or reject the image.

4. The system of claim 3, wherein the administration segment allows the authorized user to add and/or modify digital image requirements that are used to acquire digital images for storage in the database.

5. The system of claim 1, wherein a reports module of the management system allows an authorized user to determine if all digital image requirements have been met and whether any digital images have been indicated rejected by a user.

6. The system of claim 5, wherein the management system permits an authorized user to identify users who have not indicated approval of a digital image at any given time.

7. The system of claim 1, wherein if a digital image is indicated as rejected by a user, an electronic communication is automatically sent to the plurality of authorized users.

8. The system of claim 1, wherein the system is web-based and the management system can be accessed by a user via Internet.

9. The system of claim 1, wherein the plurality of digital images are of product assemblies and are taken before a product assembly is released for use.

10. The system of claim 1, wherein a product assembly is a space rocket and the plurality of digital images are taken as a pre-launch operation, before the space rocket is released for launch.

11. A method for storing and managing digital images in a database, comprising:
    providing a computing system;
        acquiring a plurality of digital images based on digital image requirements for product assemblies;
        providing a server configured to access the database, the database including a management system, the management system including a user interface;
        uploading the plurality of digital images to the database;
        permitting selective access to the plurality of digital images to a plurality of users using the user interface, based on user authority, from the computing system;
    indicating acceptance or rejection of a digital image, by one or more users, based on user authority;
        storing the indication of acceptance or rejection of the digital image in the database and
        notifying a plurality of users if an authorized user indicates rejection of a digital image, wherein the users are notified via electronic mail.

12. The method of claim 11, wherein a summary segment of the management system allows a user to view a list of plurality of digital images, view an actual image, view image information and indication of approval or rejection of a digital image.

13. The method of claim 11, further comprising:
    Adding a user with an authority to either indicate approval or rejection of a digital image, or as a reviewer who is allowed to review the digital image without having the authority to approve or reject the image.

14. The method of claim 12, wherein an administration segment of the management system allows an authorized user to add a new user, wherein the new user can be an approver of a digital image, having an authority to indicate approval or rejection of the digital image, or the user is a reviewer who is allowed to review the digital image without having the authority to indicate approval or rejection of the image and the administration segment allows the authorized user to add and/or modify digital image requirements that are used to acquire digital images for storage in the database.

15. The method of claim 11, further comprising:
    generating a report that allows a user to determine if all digital image requirements have been met and whether any digital images have been indicated as rejected by a user, wherein the authorized user can identify all users who have not indicated approval of a digital image at any given time.

16. The method of claim 15, wherein a reports module of the management system allows an authorized user to determine if all digital image requirements have been met and whether any digital images have been indicated as rejected by a user.

17. The method of claim 11, wherein the plural digital images are of product assemblies and are taken before a product assembly is released for use.

18. The method of claim 17, wherein a product assembly is a space rocket and the plural digital images are taken as a pre-launch operation, before the space rocket is released for launch.

* * * * *